Jan. 22, 1929.
S. ARMATA
RELINER FOR BALLOON TIRES
Filed Sept. 2, 1926
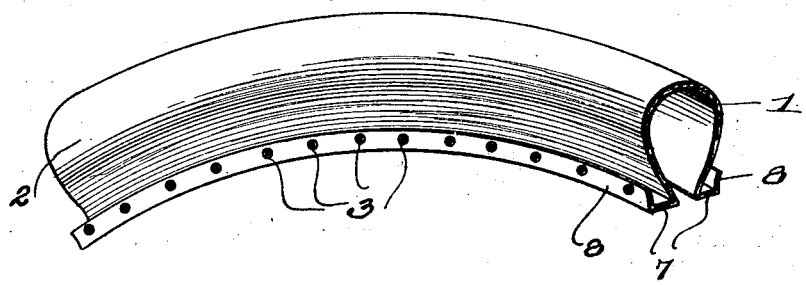
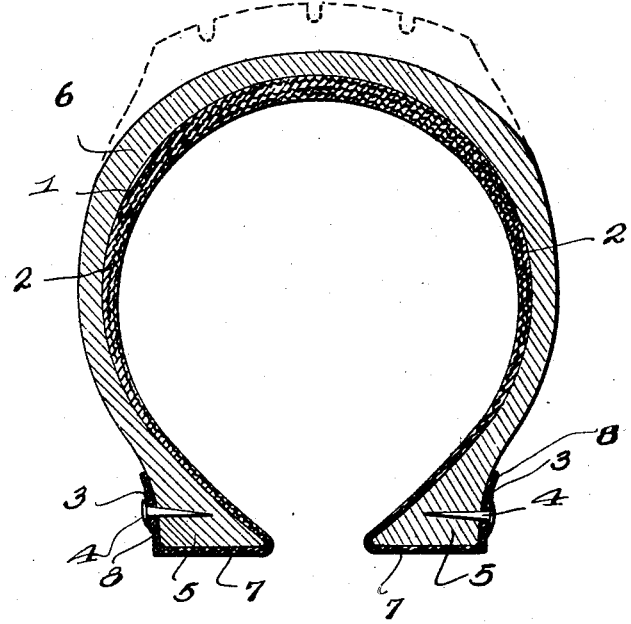
Inventor
Sam Armata.

Patented Jan. 22, 1929.

1,700,014

UNITED STATES PATENT OFFICE.

SAM ARMATA, OF GOOSE CREEK, TEXAS.

RELINER FOR BALLOON TIRES.

Application filed September 2, 1926. Serial No. 133,183.

This invention relates to a reliner for balloon tires and it consists in the novel features hereinafter described and claimed.

An object of the invention is to provide a balloon tire casing reliner in the form of a strip or section bearing against the inner surface of the tire casing and extending around the beads, to which it is secured by means of tacks or other equivalent securing devices, to protect the weakened or broken side walls of a balloon tire casing and prolong the usefulness of the casing.

A further object of the invention is to provide a reliner for the purposes stated which is cheap to manufacture and may be easily and quickly applied to the casing.

With these objects in view, the reliner for balloon tires consists of a strip composed of layers of woven fabric which form the inner portion of the reliner and are embedded in soft rubber, some of the layers of fabric being extended at the sides of the reliner beyond the edges thereof and the broader plies of the fabric which extend around the beads of the tire casing provided with eyelets through which tacks may be passed and forced into the beads to effectually hold the reliner in place upon the tire casing, the reliner extending around the tire casing or a section thereof sufficient to cover a damaged or worn spot in the tire casing.

In the accompanying drawing,

Figure 1 is a perspective view of a section of the reliner for balloon tires, and Figure 2 is a transverse sectional view of a tire casing showing the reliner applied thereto.

The reliner for balloon tire casings consists of a strip composed of several plies 1 of fabric which form the inner portion of the reliner, and some of these plies are extended to the outer edges of the reliner and all the plies are embedded in vulcanized rubber, as indicated by the numeral 2. The projecting edge portions of the reliner are provided with metal eyelets 3 through which tacks 4 are passed and forced into the beads 5 of the usual tire casing 6. The tacks 4 are preferably forced into the beads 5 by using pliers and for all practical purposes common carpet tacks may be used for this purpose.

When the reliner is applied to the inner surface of a tire casing, it lies snugly against the inner surface thereof and extends around the beads 5 as best shown in Figure 2 whereby the beads are protected by the reliner against rim cutting and the intermediate portion of the reliner will effectually support the inner tube of the tire structure and permit the same to have its intended balloon configuration when inflated and consequently the casing will be held in the desired shape and any punctures in the casing will be closed so that the usefulness of the casing is prolonged.

I am aware that reliners have been provided for tire casings but such reliners cannot be used to advantage in conjunction with balloon tires for the reason that when applied to the casing they do not permit the balloon tire tube to be inflated to hold the casing in the intended and desired shape. This is due principally to the use of relatively rigid material as for instance metal. The reliner for balloon tires constructed as herein shown and described may be manufactured cheaply and is more desirable than those which use metal or other more rigid material, and by providing metal eyelets for the tacks to pass through said tacks are prevented from cutting the reliner.

In its finished form, the reliner is provided with the edge portions 7 and 8 adapted to bear against the exterior surfaces of the beads 5 of the tire casing and these portions, though yielding, are somewhat more rigid than the intermediate portion of the tire. This condition is produced by subjecting the rubber coating 2 at the edge portions 7 and 8 to a greater degree of vulcanization than the other part of the reliner and the said edge portions serve to hold the reliner in its intended and desired shape as best shown in Figure 1 of the drawing. The eyelets 3 hereinbefore described pass through the opposite edge portion 8 of the reliner and inasmuch as these portions are relatively tough the possibility of the eyelets cutting through the material is reduced to a minimum.

Having described the invention, what is claimed is:

1. A reliner for a tire casing comprising an inner casing composed of several plies of fabric embedded in rubber with the opposite edges of said inner casing turned up to engage the bead of the tire casing and said upturned edges or side portions subjected to a greater degree of vulcanization than the other portion of the reliner to increase its stability for engaging the bead.

2. A reliner for a tire casing comprising an inner casing composed of several plies of fabric embedded in rubber with the opposite edges of said inner casing turned up to engage the bead of the tire casing and said up-turned edges or side portions subjected to a greater degree of vulcanization than the other portion of the reliner to increase its stability for engaging the bead, and eyelets in said up-turned edges or side portions arranged in series longitudinally thereof.

In testimony whereof, I have affixed my signature.

SAM ARMATA.